United States Patent [19]
Smith et al.

[11] Patent Number: 5,533,061
[45] Date of Patent: Jul. 2, 1996

[54] METHOD AND APPARATUS FOR DETECTING AN FSK ENCODED CARRIER SIGNAL

[75] Inventors: Gregory M. Smith; Michael W. Yeager, both of Colorado Springs; J. Donald Pauley, Estes Park; Gary T. Carroll, Boulder, all of Colo.

[73] Assignee: Racom Systems, Inc., Englewood, Colo.

[21] Appl. No.: 194,694

[22] Filed: Feb. 10, 1994

[51] Int. Cl.$^6$ .................................................. H03D 3/00
[52] U.S. Cl. .......................... 375/334; 375/335; 329/300; 329/302
[58] Field of Search ................................ 375/334, 335, 375/336; 329/300, 302, 303

[56] References Cited

U.S. PATENT DOCUMENTS

| | | | |
|---|---|---|---|
| 3,601,710 | 8/1971 | Morra | 329/303 |
| 3,899,741 | 8/1975 | Brandt et al. | 329/301 |
| 4,485,448 | 11/1984 | Kurth | 364/484 |
| 4,785,255 | 11/1988 | Lucak et al. | 329/303 |
| 5,150,382 | 9/1992 | Kume | 375/334 |
| 5,245,632 | 9/1993 | Greiss et al. | 375/328 |

OTHER PUBLICATIONS

Ramtron Corporation, R2 92490, Ramtron Brochure, RTx 0801 Ramtag™, 256-Bit Passive Nonvolatile RF/ID Tag Engineering Prototype, 1990, pp. 1–6.

Ramtron International Corporation, Ramtron Brochure, FM1208S FRAM® Memory, 4,096-Bit Nonvolatile Ferroelectric RAM Product Specification, R3 Aug., 1993, pp. 1–8.

*Primary Examiner*—Edward L. Coles, Sr.
*Assistant Examiner*—Allan A. Esposo
*Attorney, Agent, or Firm*—Peter J. Meza; William J. Kubida; Holland & Hart

[57] ABSTRACT

An integrated FSK detector circuit includes a first counter that receives a carrier signal and provides a multiple-bit output for reducing the frequency of the carrier signal into a plurality of weighted sub-multiples. An oscillator enable decoder circuit provides predetermined calibrate and measure pulses in response to the first counter output. A gated oscillator receives the calibrate and measure pulses and provides a burst of oscillator pulses during these time intervals. A second counter has an input coupled to the output of the gated oscillator and an up/down control terminal coupled to the output of the first counter. The output of the second counter also provides a multiple-bit output for reducing the frequency of the gated oscillator pulses. An FSK decoder logic circuit decodes the multiple-bit output of the second counter into a single bit FSK detect signal. The FSK detector circuit also includes a reset circuit coupled to the first counter for resetting between FSK detections.

23 Claims, 8 Drawing Sheets

FSK DECODE TABLE

| binary | hex |
|--------|-----|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | B |
| 1100 | C |
| 1101 | D |
| 1110 | E |
| 1111 | F |

NON-FSK: 0–3
FSK DETECT: 4–F

*Fig. 6*

METHOD AND APPARATUS FOR DETECTING AN FSK ENCODED CARRIER SIGNAL

CROSS REFERENCE TO RELATED APPLICATIONS

The present invention is related to the inventions described in the following U.S. patent applications:

Ser. No. 08/194,616 entitled "Passive RF Transponder and Method";

Ser. No. 08/194,723 entitled "Communications System Utilizing FSK/PSK Modulation Techniques";

Ser. No. 08/194,708 entitled "FSK Detector Circuit and Method";

Ser. No. 08/195,162 entitled "Low Power Consumption Oscillator Using Multiple Transconductance Amplifiers"; and Ser. No. 08/319,289 entitled "Power Supply and Power Enable Circuit for an RF/ID Transponder", all of which applications are filed concurrently herewith and assigned to the assignee of the present invention, the disclosures of which are hereby specifically incorporated by this reference.

BACKGROUND OF THE INVENTION

This invention relates generally to the field of frequency shift keying detector circuits and methods utilized for the demodulation of a data signal from a modulated carrier signal. More particularly, the present invention relates to a digital circuit implementation of a frequency shift keying detector suitable for fabrication on an integrated circuit.

In its simplest terms, a data signal, typically a digital data signal, may be used to modulate the amplitude, the frequency, or the phase of a carrier signal depending upon the particular application. Respectively, these three types of modulation are known as amplitude shift keying ("ASK"), frequency shift keying ("FSK"), and phase shift keying ("PSK"). In any of these modulation techniques, the modulated carrier signal takes on one of two states, that is, either one of two amplitudes, two frequencies, or two phases. The two states of the modulated signal then represent either a logic "zero" or a logic "one."

As noted above, changing the frequency of the modulated carrier signal to denote either of two digital logic states is called FSK modulation. FSK modulation offers a number of advantages in certain applications over other modulation techniques with respect to noise immunity and average signal power level. However, in conventional FSK detectors, it is necessary to have a reference frequency associated with the detector in order to determine whether a change in frequency denoting a data bit one or zero has occurred. If a reference frequency is available, however, detecting the data signal is normally a simple process. The input carrier signal is compared with the reference frequency. If the frequency of the carrier signal is higher than the reference frequency a data bit one may be assigned, and if the frequency of the carrier signal is lower than the reference frequency, a data bit zero may be assigned.

Therefore, while it would be advantageous to use FSK modulation techniques to transmit data to an integrated FSK detector, providing a reference frequency with a tight tolerance on an integrated circuit is extremely difficult. An absolute reference frequency with tightly controlled tolerances is difficult to achieve on an integrated circuit because of the variation in process, alignment, and other manufacturing variables. An absolute tolerance of 20% to 30% in a reference frequency provided by, for example, an on-chip oscillator is typical without resorting to off-chip precision resistors, capacitors, or crystal oscillators. Further, neither the loose tolerance of an integrated circuit implementation nor the addition of external precision components is desirable in an FSK detector. The traditional integrated circuit implementation degrades the accuracy of the FSK detector and off-chip precision components increase the cost.

What is desired is an integrated circuit implementation of an FSK detector that will accurately detect an FSK modulated carrier signal, given the limitations of integrated circuit processing, and particularly with respect to the lack of a precision on-chip reference frequency.

SUMMARY OF THE INVENTION

It is, therefore, a principal object of the present invention to accurately detect an FSK modulated carrier signal with a conventionally fabricated integrated circuit.

It is another object of the invention to provide an FSK detector circuit that is substantially insensitive to environmental factors such as temperature and substantially insensitive to operating voltage.

It is an advantage of the invention that the integrated FSK detector circuit die size is small and the corresponding unit cost is low.

It is another advantage of the invention that the integrated FSK detector circuit can be fabricated together with other circuits on a single integrated circuit to implement system level functions.

According to the present invention an integrated FSK detector circuit includes a first counter that receives a carrier signal and provides a multiple-bit output for reducing the frequency of the carrier signal into a plurality of weighted sub-multiples. An oscillator enable decoder circuit provides predetermined calibrate and measure pulses in response to the first counter output. A gated oscillator receives the calibrate and measure pulses and provides a burst of oscillator pulses during these time intervals. The gated oscillator can have a wide absolute tolerance, as well as a sensitivity to temperature, so that it is suitable for integrated circuit implementation. A second counter has an input coupled to the output of the gated oscillator and an up/down control terminal coupled to one of the outputs of the first counter. The output of the second counter also provides a multiple-bit output for reducing the frequency of the gated oscillator pulses into a plurality of weighted sub-multiples. An FSK decoder logic circuit decodes the multiple-bit output of the second counter into a single bit FSK detect signal. The FSK detector circuit also includes a reset circuit coupled to the first counter for resetting the second counter between FSK detections.

In operation, the FSK detection method includes the steps of setting a calibrate timing interval corresponding to a predetermined number of cycles of the carrier signal; counting, from an initial count value, the number of cycles of an oscillator during the calibrate timing interval; setting a measure timing interval corresponding to a predetermined number of cycles of the carrier signal; counting the number of cycles of the oscillator during the measure timing interval; generating a final count corresponding to the difference between the number of cycles of the oscillator in the calibrate timing interval and the measure timing interval;

and generating an FSK detect signal responsive to the final count. The difference between the number of oscillator cycles in the respective times intervals is expressed as a multiple-bit digital word having a plurality of logic states. A first predetermined number of binarily consecutive logic states correspond to the non-occurrence of an FSK detection, and the remaining binarily consecutive logic states correspond to the occurrence of an FSK detection. If greater reliability is desired, the counting steps (i.e., the measure and calibrate cycle) may be repeated numerous times for each FSK detection.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 is an FSK decode table corresponding to the output of a four-bit counter of the FSK detector circuit;

DETAILED DESCRIPTION

Figure 1:
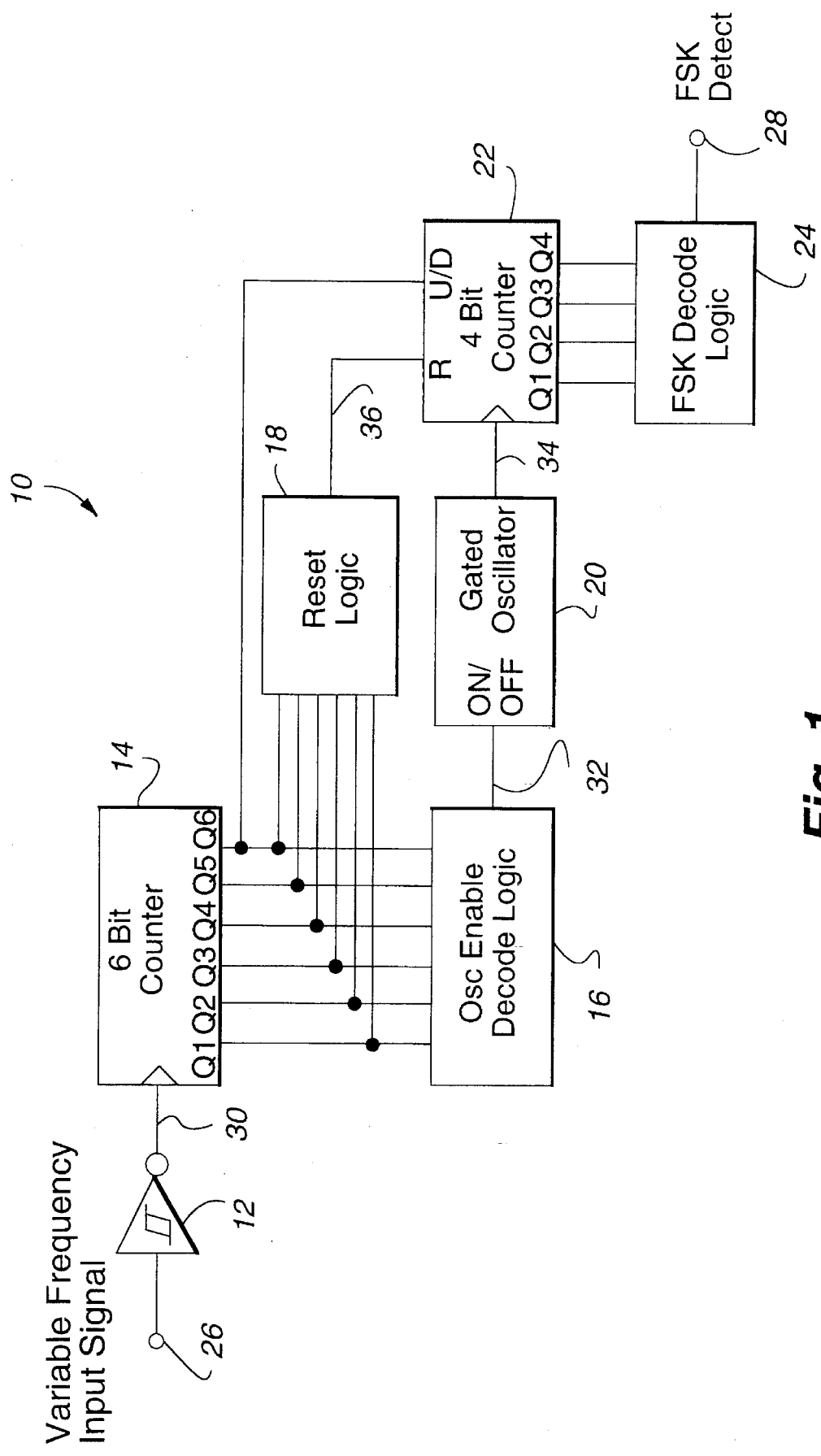
FIG. 1 is a block diagram of the FSK detector circuit of the present invention.
Figure 7:
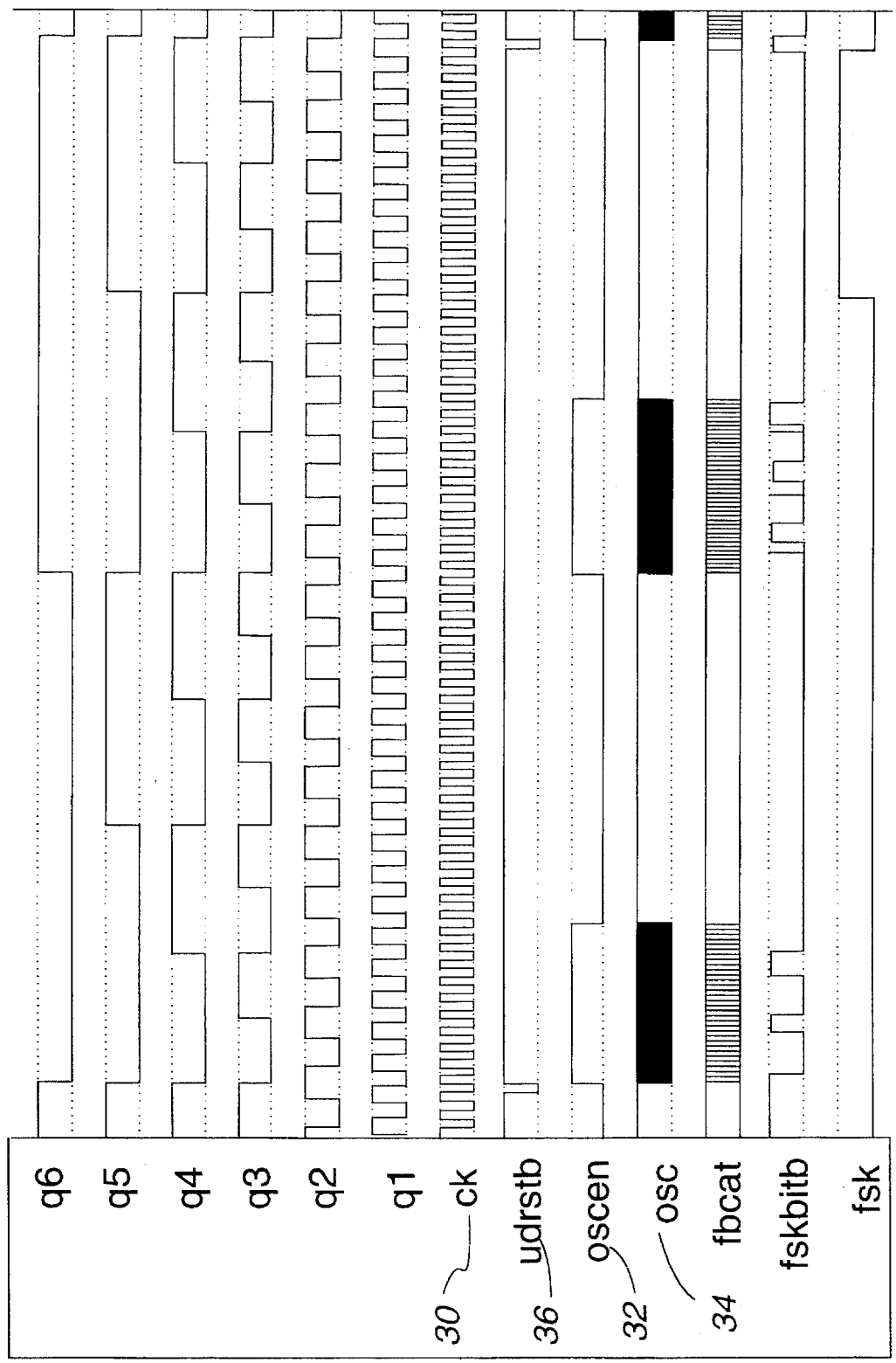
FIG. 7 is a timing diagram for various nodes in the FSK detector circuit.

Referring now to FIG. 1, an FSK detector 10 is shown that includes a Schmitt trigger inverter 12, a six-bit counter 14, an oscillator enable decoder 16, a reset logic block 18, a gated oscillator 20, a four-bit counter 22, and an FSK decoder 24. A carrier signal is received at the input node 26 of the FSK detector, which in the preferred embodiment, is the input of inverter 12. Inverter 12 is optionally used if the carrier signal is a sine wave or other non-digital waveform. Inverter 12 is used as a signal conditioning circuit to transform a sine wave or other non-digital waveform carrier signal into a digital square wave having full logic levels. The output of inverter 12 is coupled to the input of six-bit counter 14 through conductor 30. The square wave signal on conductor 30 is designated as the clock signal or "CK" for identification on the subsequent timing diagram of FIG. 7. The input of counter 14 thus receives the digital carrier signal on conductor 30 and has a six-bit output designated Q1 through Q6. output Q1 represents the divide-by-two output, or the least significant bit output ("LSB"), and output Q6 represents the divide-by-sixty-four output, or the most significant bit output ("MSB"). Referring momentarily to FIG. 7, the topmost seven waveforms represent the CK and Q1-Q6 signals.

An oscillator enable decoder 16 is a digital logic circuit having a six-bit input corresponding and coupled to the six-bit output of counter 14. The oscillator enable decoder 16 is configured to provide a "calibrate" pulse followed at a subsequent time by a "measure" pulse in cyclical response to the first counter output. The nature and timing of these pulses is described in greater detail below. The output of decoder 16 is coupled to the rest of FSK detector 10 circuitry through conductor 32. The signal on conductor 32 is designated as the oscillator enable signal or "OSCEN" for later timing diagram identification. A gated oscillator 20 has a gating or "ON/OFF" input coupled to the output of oscillator enable decoder 16 through conductor 32. The output of gated oscillator 20 is coupled to the rest of FSK detector 10 circuitry through conductor 34. Gated oscillator 20 receives the calibrate and measure pulses at its input (conductor 32) and provides a burst of oscillator pulses at its output (conductor 34) during these time intervals. The output signal on conductor 34 is designated as the oscillator output signal or simply "OSC" for identification on the subsequent timing diagram of FIG. 7. A four-bit counter 22 has a single input coupled to the output of gated oscillator 20 through conductor 34, an up/down control terminal labeled "U/D" coupled to the output of the first counter 14, a reset terminal labeled "R" and a four-bit output. The four-bit output is designated Q1 through Q4. Similar to counter 14, output Q1 of counter 22 represents the divide-by-two output, or the LSB, and output Q4 represents the divide-by-sixteen output, or the MSB. Referring momentarily to FIG. 7, the four-bit counter output signal is designated "FBCNT" and is assigned a hex value corresponding to the count at the end of the oscillator burst. The up/down terminal is coupled to the Q6 output of counter 14, and, therefore the polarity of the Q6 signal controls the direction of counting. An FSK decoder logic block 24 has a four-bit input corresponding and coupled to the four-bit output of counter 22. The FSK decoder 24 comprises a digital logic circuit configured to provide an FSK detect signal in response to the logic states generated by the signals at the output of counter 22. The output node 28 of decoder 24 thus provides the single-bit FSK detect signal designated FSK out or "FSK" in FIGS. 7–8. The remaining functional block shown in FIG. 1 includes a reset logic circuit 18 having a six-bit input coupled to the six-bit output of counter 14. The single output of reset logic circuit 18 is coupled to the reset input of counter 22 through conductor 36. The reset signal on conductor 36 is designated "UDRSTB" in the subsequent timing diagram. Reset logic circuit 18 is a digital logic circuit configured to provide a reset pulse 36 or udrstb of FIG. 7 to counter 22 before each occurrence of a counting cycle that is determined by a cycle of the Q6 output of counter 14, which cycle first includes a calibrate pulse, and then a measure pulse on line 32 (see oscen of FIG. 7). The timing of the reset pulse and its significance to the operation of FSK detector 10 is described in further detail below.

Figure 2:
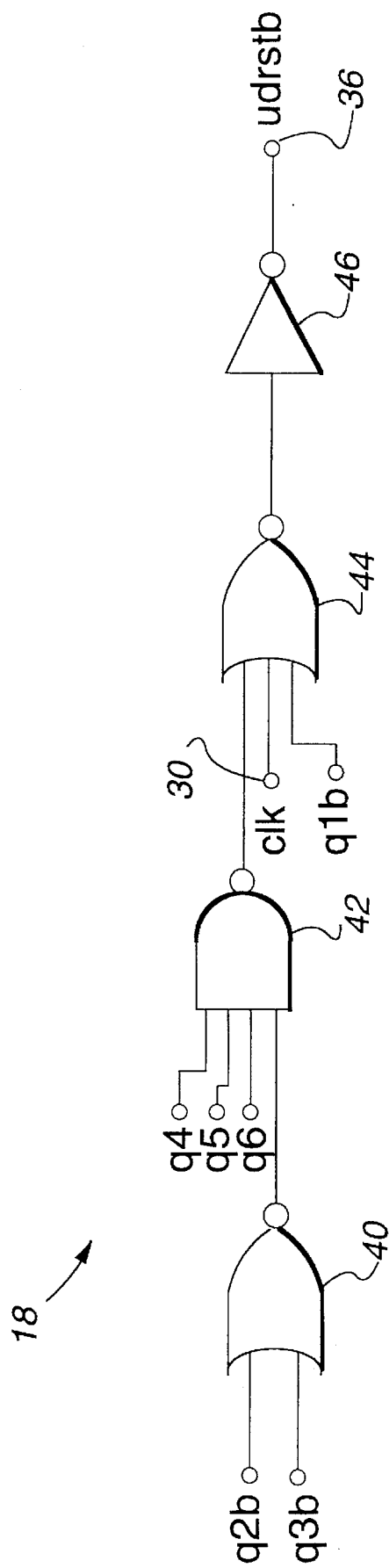
FIG. 2 is a gate-level schematic diagram of the reset logic block of the FSK detector circuit.

Turning now to FIG. 2, which is a gate-level schematic diagram of reset logic circuit 18, there is shown a logic circuit including NOR gates 40 and 44, NAND gate 42, and inverter 46. NOR gate 40 receives the inverted Q2 and inverted Q3 signals from six-bit counter 14. The inverted output signals provided by counter 14 are not shown in FIG. 1. NAND gate 42 receives the Q4, Q5, and Q6 signals from counter 14, as well as the output from NOR gate 40. NOR gate 44 receives the CLK signal from inverter 12, the inverted Q1 output from counter 14, and the output signal from NAND gate 42. Finally, inverter 46 receives the output signal from NOR gate 44 to provide the reset signal UDRSTB at node 36.

Figure 3:
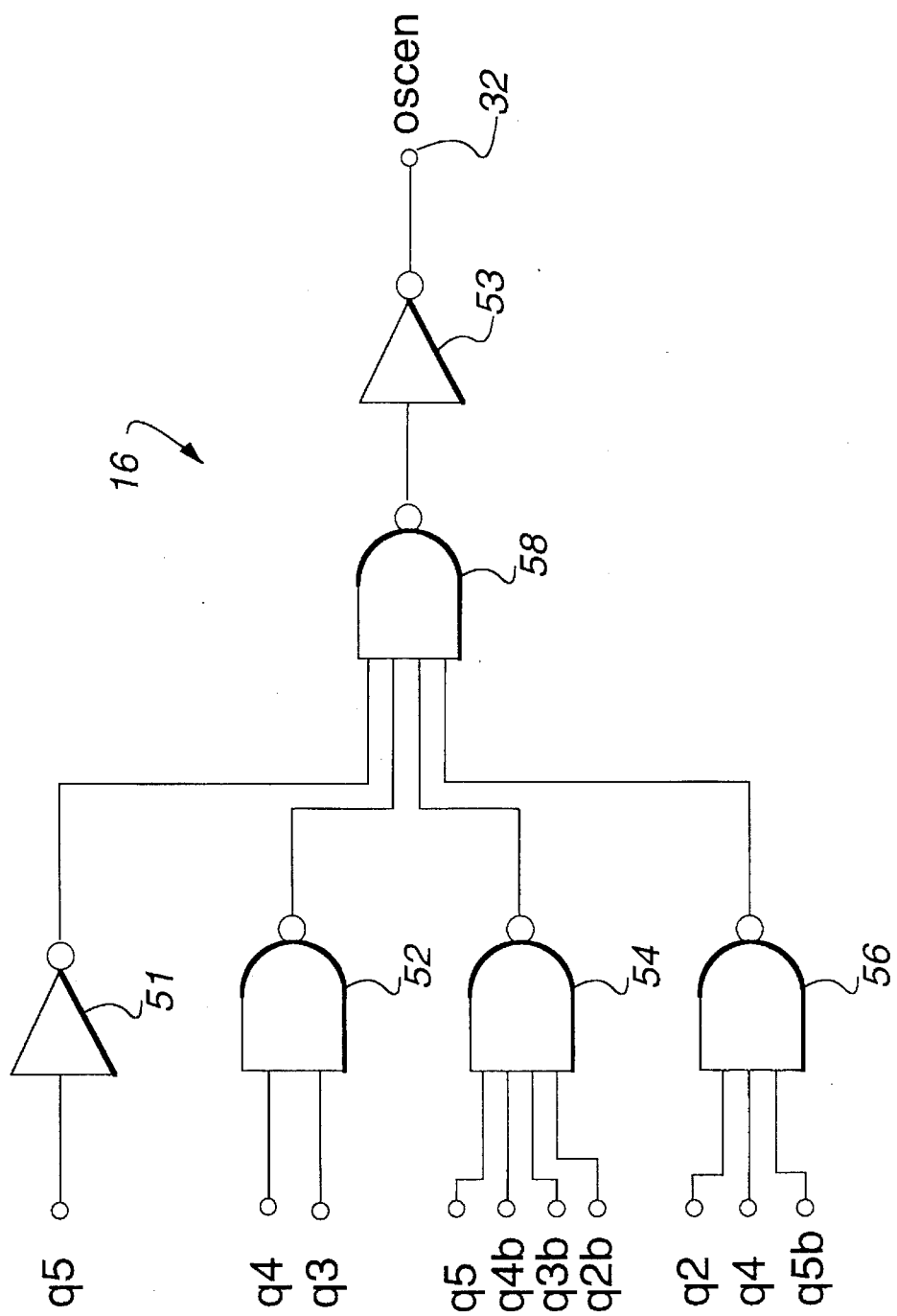
FIG. 3 is a gate-level schematic diagram of the oscillator enable decode logic block of the FSK detector circuit.

Turning now to FIG. 3, which is a gate-level schematic diagram of oscillator enable decoder 16, there is shown a logic circuit including NAND gates 52, 54, 56, and 58, and inverters 51 and 53. Inverter 51 receives the Q5 signal from six-bit counter 14. NAND gate 52 receives the Q3 and Q4 signals from counter 14. NAND gate 54 receives the inverted Q2, Q3, and Q4 as well as the non-inverted Q5 signal from counter 14. NAND gate 56 receives the non-inverted Q2 and Q4 signals, as well as the inverted Q5 signal, from counter 14. NAND gate 58 receives the output signals from inverter 51, as well as NAND gates 52, 54, and 56. Finally, inverter 53 receives the output signal from NAND gate 58 to provide the oscillator enable signal OSCEN at node 32.

Figure 4:
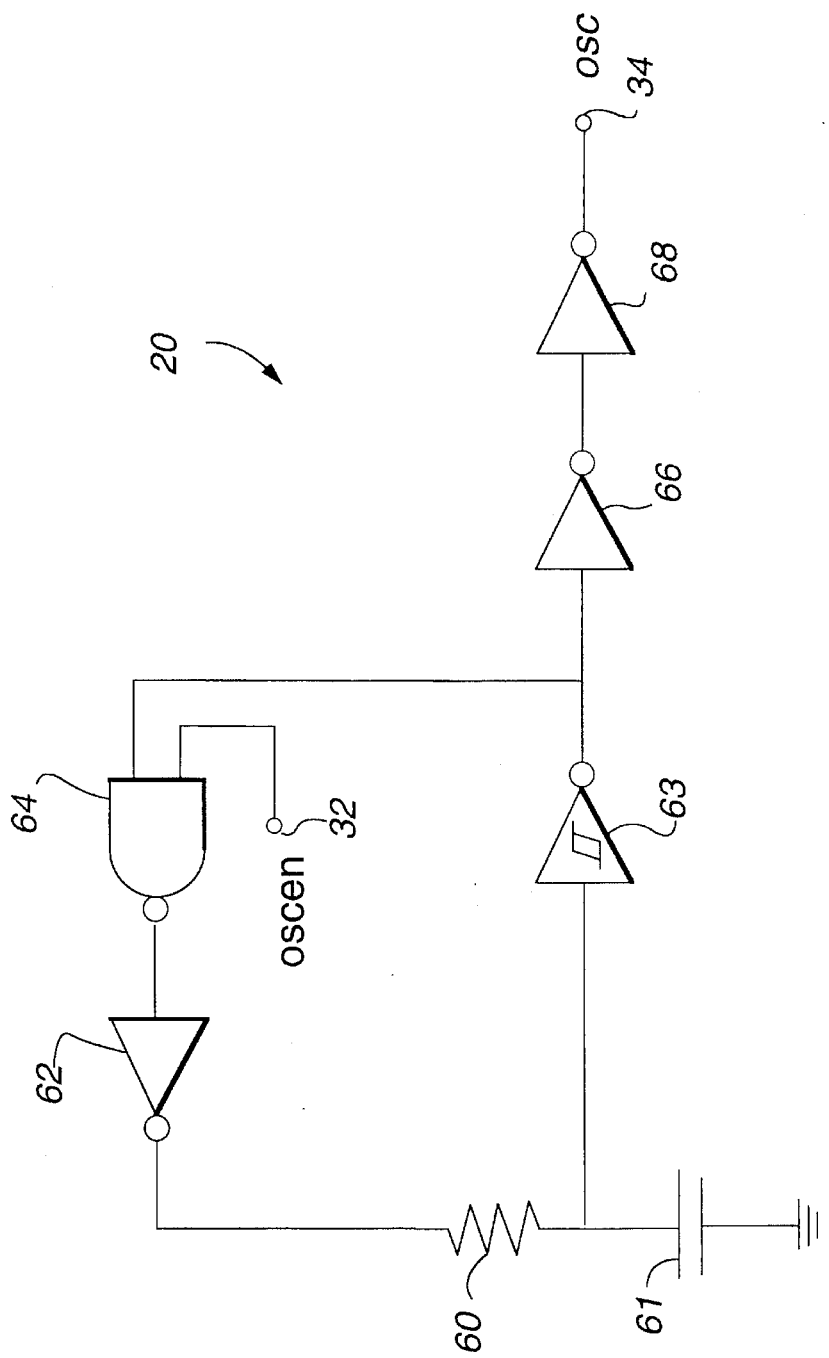
FIG. 4 is a schematic diagram of the gated oscillator of the FSK detector circuit.

The schematic diagram of gated oscillator 20 is shown in FIG. 4 and includes a passive frequency-setting network 60, 61, a gating circuit 62, 64, a signal conditioning circuit 63 and an output buffer 66, 68. The passive frequency-setting network includes a resistor 60 and a capacitor 61. The oscillator frequency initially set by resistor 60 and capacitor 61 is further modified by the positive and negative input voltage thresholds of signal conditioning circuit 63. The value of resistor 60 is nominally set to 250 Kohms and the value of capacitor 61 is set to the gate capacitance of a field-effect transistor ("FET"), nominally about one picofarad. The nominal oscillator frequency of the oscillator 20 is thus about 1.4 megahertz. The junction of resistor 60 and capacitor 61 is coupled to a Schmitt trigger inverter 63, which acts as a signal-conditioning circuit, turning the waveform at the input into a substantially clean digital signal having full logic levels. The output of inverter 63 is coupled to the gating circuit including NAND gate 64 in series connection with inverter 62. NAND gate 64 includes an additional input for receiving the gating OSCEN signal at node 32. The output of inverter 62 is coupled to resistor 60. Note that the signal polarity from the input of signal conditioning circuit 63 to the output of gating circuit 64, 62 is inverted. The inversion in the loop shown in FIG. 4 is necessary to provide an oscillation. The output of inverter 63 is also coupled to inverters 66 and 68, which act as a buffer circuit to provide the digital OSC signal with sharply defined edges at output node 34.

Figure 5:
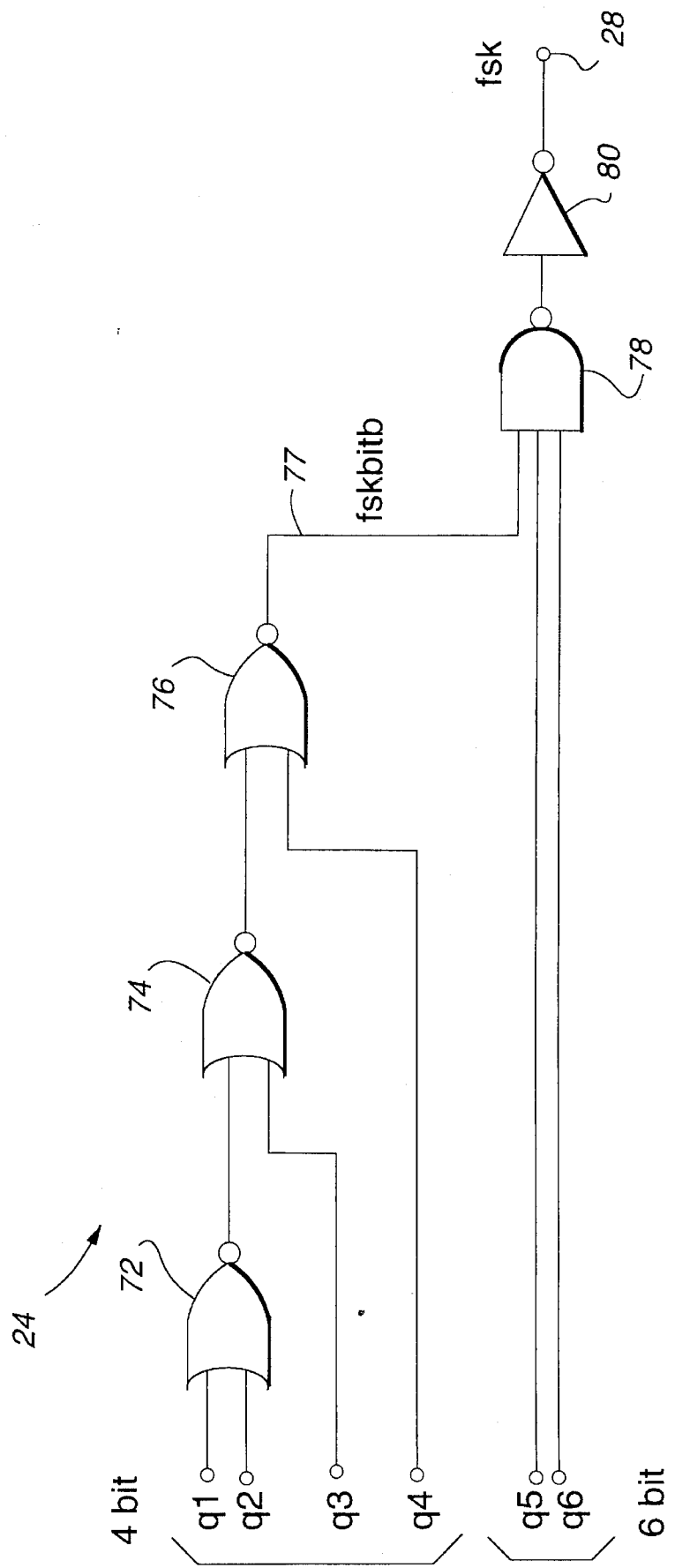
FIG. 5 is a gate-level schematic diagram of the FSK decode logic block of the FSK detector circuit.

Turning now to FIG. 5, which is a gate-level schematic diagram of FSK decoder 24, there is shown a logic circuit that includes NOR gates 72, 74, and 76, NAND gate 78, and inverter 80. NOR gate 72 receives the Q1 and Q2 signals from counter 22, NOR gate 74 receives the inverted Q3 signal from counter 22 and the output signal from NOR gate 72, and NOR gate 76 receives the Q4 signal from counter 22 and the output signal from NOR gate 74. The output of NOR gate 76 provides the FSKBITB signal on conductor 77. NAND gate 78 receives the FSKBITB signal, as well as the Q5 and Q6 signals from counter 14. NAND gate 78 is in series connection with inverter 80, which in turn provides the FSK detection signal at node 28.

In operation, the method for demodulating the FSK encoded data signal from the carrier signal includes the steps of setting a calibrate timing interval corresponding to a predetermined number of cycles of the carrier signal; counting, from an initial count value, the number of cycles of an oscillator during the calibrate timing interval; setting a measure timing interval corresponding to a predetermined number of cycles of the carrier signal; counting the number of cycles of the oscillator during the measure timing interval; generating a final count corresponding to the difference between the number of cycles of the oscillator in the calibrate timing interval and the measure timing interval; and generating an FSK detect signal responsive to the final count. In present invention, the unmodulated carrier frequency is set to 125 KHz, the modulated carrier frequency is set to 116.3 KHz, and the CLK signal frequency is set to the carrier frequency.

In FIG. 7, a timing diagram is shown that illustrates the various waveforms of FSK detector 10 present during an FSK detection. It is important to note that in FIG. 7 a transition from one carrier frequency to another carrier frequency capable of being detected by FSK detector 10 occurs during the spacing timer interval (denoted by the time interval between assertion of the OSCEN pulses). The fine changes in the pulsewidths of the CK and other waveforms are not, however, detectable in FIG. 7. Timing waveforms Q1 through Q6 are the submultiples of the CK signal, which is also shown in FIG. 7. The reset pulse UDRSTB initiates a new complete count cycle, consisting of a calibrate timing interval and measure timing interval. The calibrate and measure timing intervals are shown as pulses in FIG. 7, which is also designated the OSCEN waveform. The length of the calibrate and measure timing intervals are chosen to allow gated oscillator 20 to generate numerous oscillator cycles, which are in turn counted by four-bit counter 22. The calibrate and measure timing intervals are separated by a time interval in which no counting occurs. This spacer timing interval is desirable in certain applications to allow the transition from one carrier frequency to another carrier frequency (which, when present as in FIG. 7, takes place during the spacing timer interval) to develop gradually over a period of time. The spacer timing interval can be shortened if, in the desired application, the transition from one carrier frequency to another is correspondingly shortened. The calibrate and measure timing intervals, and the spacer timing interval are all chosen according to the desired application. The positive edges of the calibrate and measure pulses coincide with the signal transitions of the Q6 output waveform of counter 14. The calibrate pulse, together with the U/D signal (Q6 output) cause counter 22 to begin counting up. With the method of the present invention, four-bit counter 22 "wraps around" several times before counting ceases at the end of the calibrate pulse. Ultimately, since the decision as to whether or not an FSK detection has occurred only depends on a few bits, such as four in the present case, it is not necessary to preserve all of the most significant bits in counter 22. The number of bits in counter 22 can be increased if desired for greater accuracy, but this is a design choice based upon a specific application. After the spacer timing interval has passed, the measure pulse, together with the U/D signal (Q6 output) cause counter 22 to begin counting back down. Again, four-bit counter 22 will wrap around the same number of times before arriving at a "final count", which is defined as the difference between the up count generated during the calibrate time interval and the down count generated during the measure time interval.

Four-bit counter 22 generates a four-bit digital word having sixteen logic states that represent the final count. In FIG. 6 each of the sixteen logic states of the four-bit digital word is illustrated in the FSK decode table, both in binary and hex format. As indicated by the labels "FSK DETECT" and "NON-FSK" along the left edge of the table, a first predetermined group of logic states correspond to an occurrence of an FSK detection and a second predetermined group of logic states that correspond to a non-occurrence of an FSK detection. In the present invention, four binarily consecutive logic states (logic states 0-3 in the hex format) correspond to the non-occurrence of an FSK detection, and twelve binarily consecutive logic states (4-F in the hex format) correspond to the occurrence of an FSK detection. The table of FIG. 6 conveys one approach for segregating the logic states of counter 22 into those states that represent an FSK detection and those states that represent the non-occurrence of an FSK detection. While the number and partitioning of the states is a matter of design choice based upon the desired application, the principle behind the choice is that an FSK detection does not occur if counter 22 counts up and back down to a state close to the initial count, whereas an FSK detection does occur if counter 22 counts up and back down to a count that is significantly different than the initial count. Returning now to FIG. 7, the oscillator output OSC is shown as a series of negative going pulse bursts. Since the frequency of the oscillator is about ten times as great as the clock signal, the individual clock cycles can not be distinguished and are shown as a solid black pulse burst. The output of counter 22, signals Q1–Q4 are grouped together in hex format as a single hex word and are represented by the FBCNT waveform. The letters "d" and "e" represent the four-bit hex word after each counting interval has ceased. The FSKBITB waveform is the signal found at node 77 shown in FIG. 5. The FSKBITB signal changes polarity several times during a count cycle, but only becomes valid when the final count is available, which is at the negative edge of the measure pulse. The FSK signal, therefore, is the logical combination of the Q5 and Q6 valid outputs from the six-bit counter 14, and the inverted FSKBITB signal. The FSK signal is then true for the period after the final count when signal Q5 is true. The exact timing is useful for the present method in that FSK is made available for a specific period of time, but again, the exact timing is a matter of design choice and can be made available at a slightly different time, and for a shorter or longer time duration. The FSK signal returns to its initial low condition before the occurrence of the next UDRSTB pulse, and the initiation of a new count cycle for a new FSK detection.

If greater reliability is desired, the calibrate and measure pulses of each count cycle can be repeated several times to generate a single FSK detection. The individual count cycle results can be polled for a majority vote, treated as sub-totals for the next count cycle, or used in other ways. If the "sub-total" approach is used the FSK detection is based on the cumulative count of the total number of cycles. At the beginning of each count cycle, the initial count value of four-bit counter 22 assumes the value of the final count at the end of the previous count cycle. At the culmination of the total number of desired count cycles, a final count is generated by counter 22 corresponding to the cumulative difference between the number of cycles of gated oscillator 20 during the calibrate timing intervals and the measure timing intervals. Each calibrate and measure pulse is spaced apart in time and separated by time intervals in which no counting occurs. Each count cycle is also separated, but by the time allotted for the FSK signal to remain true. It will be appreciated from the method of the present invention that the oscillator frequency can vary from environmental factors such as temperature or from the power supply voltage over time. Thus, the frequency of oscillator 20 can vary from one FSK detection to the next FSK detection. To compensate for the undesirable change in oscillator frequency, each single count cycle of a measure and calibrate pulse captures the performance of gated oscillator 20 during a narrow time interval in which the oscillator frequency is presumed to be substantially constant. This property of the present invention makes the FSK detector circuit 10 ideally suited for integrated circuit fabrication. Neither a reference frequency generator, nor a highly accurate on-chip oscillator is needed. Gated oscillator 20 can vary absolutely, and also with environmental factors such as temperature and with power supply voltage without affecting the accuracy of the FSK detection. The four major factors that must be considered in modifying the preferred embodiment of the invention for use in other applications are: the frequency of oscillation of oscillator 20, the number of bits used in counter 22, the duration of the measure and calibrate pulses, and the frequency differential between the modulated and unmodulated carrier frequencies. Each of these factors is interrelated. It is particularly important to note that there is an engineering trade-off between the number of bits in counter 22 and the valid operating regimes for FSK detector 10. Care must be taken so that counter 22 will not count back to the original count number when an FSK shift is present. If this operating condition is allowed to occur, FSK detector 10 will not detect the presence of a frequency shift in the carrier frequency even though such a shift occurs. Note that counter 22 could be designed, if desired, to contain a sufficient number of bits so that it never "wraps-around" thus eliminating the problem. Such a design modification, however, would undesirably increase the corresponding integrated circuit die area.

Figure 8:
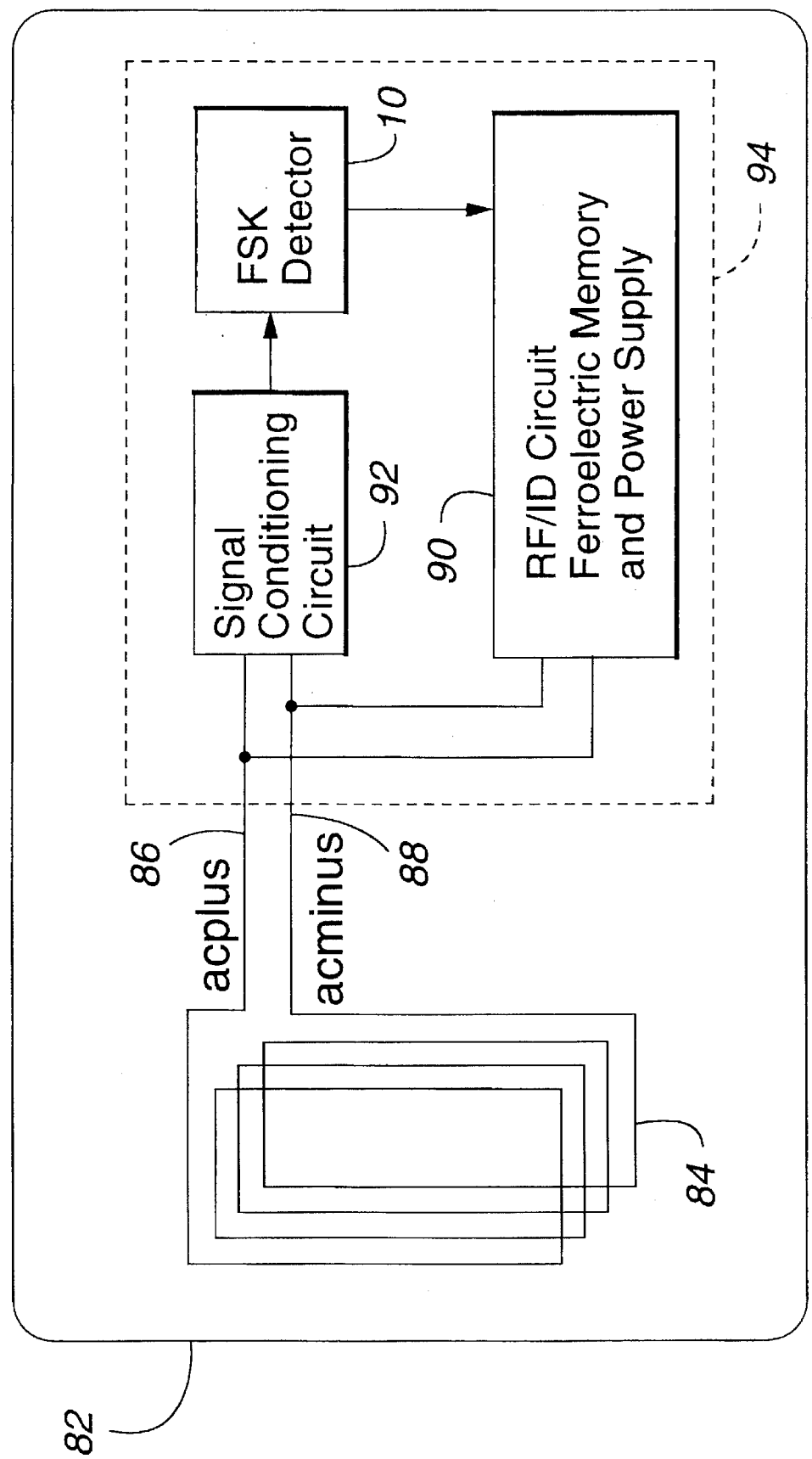
FIG. 8 is a block diagram of an RF/ID transponder card embodying the FSK detector of the present invention.

One desirable application of the FSK detector 10 of the present invention is in a mobile transponder for use with a radio-frequency identification system ("RF/ID"). FIG. 8 is a simplified block diagram of an RF/ID transponder card 82 embodying FSK detector 10. The RF/ID transponder card 82 is designed to communicate with a reader/controller (not shown in FIG. 8), sending and receiving data through the antenna coil 84, and storing data in a ferroelectric memory resident of the integrated circuit 94. FSK detector 10 is integrated in a single integrated circuit 94, along with a signal conditioning circuit 92, and other RF/ID circuitry 90. RF/ID circuit 90 can include other functions such as the power supply, non-volatile memory, and communications functional blocks. The mobile RF/ID transponder card includes an antenna coil 84 having positive and negative output conductors 86 and 88 respectively designated ACPLUS and ACMINUS coupled to the signal conditioning circuit 92 and to the RF/ID circuitry 90. The signal conditioning circuit converts the signals found on conductors 86 and 88 to a digital signal that can be used by FSK detector 10. The output of FSK detector 10 is coupled to RF/ID circuit 90, where it is further processed as desired.

The RF/ID transponder card 82 need only be placed in the electric field of the reader to initiate communication; actual physical contact with the reader is not required. Antenna coil 84 is fabricated into the transponder card 82, which is about the size of a normal credit card. Typically, antenna coil 84 has several coils wrapped about the periphery of transponder 82. The inductance of antenna 84 is determined by the communication carrier frequency used to communicate between transponder 82 and the reader. Antenna 84, in conjunction with a parallel capacitor, not shown, forms a resonant circuit for locking on to the carrier frequency. For example, a nominal carrier frequency of 125 KHz could be locked on to by an antenna 12 having an inductance of 4.2 millihenries and a capacitor having a capacitance of 390 picofarads.

The non-volatile memory for retention of data in passive RF/ID transponder 82 includes ferroelectric random access memory ("FRAM®") circuitry utilizing a proprietary lead-zirconate-titanate ("PZT") ceramic thin film available from Ramtron International Corporation of Colorado Springs, Colo. Through the use of FRAM® technology, it is possible to obtain sufficient power to write to the memory array and power associated logic from a relatively weak external RF field.

Having described and illustrated the principles of the invention in a preferred embodiment thereof, it is appreciated by those having skill in the art that the invention can be modified in arrangement and detail without departing from such principles. For example, the exact timing of the calibrate and measure pulses, the reset pulse, the availability of the FSK signal, and other timing and associated logic diagrams illustrated and taught herein can be changed by those skilled in the art to conform to the specifications of a desired application. Similarly, the present invention is not limited to any frequency of operation or range of frequency of operation. The circuit of the present invention is ideally fabricated into an integrated circuit, but may be fabricated from discrete components if desired. We therefore claim all modifications and variations coming within the spirit and scope of the following claims.

We claim:

1. An FSK detector comprising:
    a first counter having an output, and having an input for receiving an FSK modulated carrier signal, said carrier signal having a frequency-shift-keyed frequency that operates to increment said first counter;
    an oscillator enable decoder having an input coupled to said output of said first counter, and having an output providing a calibrate pulse upon said first counter reaching a first count state, and thereafter providing a measure pulse upon said first counter reaching a second count state;
    a gated oscillator having an output, and having an input coupled to said output of said oscillator enable decoder;
    a second counter having an output, having an input coupled to said output of said gated oscillator, and having an up/down control terminal coupled to said output of said first counter, said second counter being selectively enabled to count up, and then count down, in response to said first and second count states of said first counter; and
    an FSK decoder having an input coupled to said output of said second counter, said FSK decoder having an output providing an FSK detect signal.

2. An FSK detector as in claim 1 in which said first counter comprises a counter having a single input and a multiple-bit output, said first counter reducing said frequency of said carrier signal into a plurality of weighted sub-multiples thereof.

3. An FSK detector as in claim 2 in which the first counter comprises a six-bit counter.

4. An FSK detector as in claim 1 in which said oscillator enable decoder comprises a digital logic circuit configured to provide said calibrate pulse followed by said measure pulse in cyclical response to increasing count states of said first counter.

5. An FSK detector as in claim 1 in which said gated oscillator comprises:
    a passive frequency-setting network having an input and an output;
    a signal conditioning circuit having an input coupled to said output of said passive frequency-setting network, and having an output that forms said oscillator output; and
    a gating circuit having a first input coupled to said output of said oscillator enable decoder, having a second input coupled to said output of said signal conditioning circuit, and having an output coupled to said input of said passive frequency-setting network, wherein the signal polarity from said input of said signal conditioning circuit to said output of said gating circuit is inverted.

6. An FSK detector as in claim 5 in which the gating circuit comprises a dual-input NAND gate in serial connection with an inverter.

7. An FSK detector as in claim 1 in which the second counter comprises a counter having a single input and a multiple-bit output for reducing the frequency of a signal at the gated oscillator output.

8. An FSK detector as in claim 7 in which the second counter comprises a four-bit counter.

9. An FSK detector as in claim 1 in which the FSK decoder comprises a digital logic circuit configured to provide an FSK detect signal in response to a predetermined number of logic states generated by a signal at the output of the second counter.

10. An FSK detector as in claim 1 in which the second counter further includes a reset terminal.

11. An FSK detector as in claim 10 further comprising a reset circuit having an input coupled to the output of the first counter.

12. An FSK detector as in claim 11 in which said reset circuit comprises a digital logic circuit configured to provide a reset pulse before each occurrence of a calibrate pulse.

13. An FSK detector as in claim 1 further comprising a signal conditioning circuit interposed between the carrier signal and the input of the first counter.

14. An FSK detector as in claim 1, fabricated in a card-like mobile RF/ID transponder.

15. An FSK detector as in claim 14, wherein said RF/ID transponder further comprises:
    an antenna for communicating with an external reader/controller;
    a signal conditioning circuit having an input coupled to said antenna, and having a digital output coupled to said input of said first counter; and
    an RF/ID communications circuit coupled to said antenna, and said communications circuit having an input coupled to receive said FSK detect signal.

16. A method for demodulating an FSK encoded data signal from a carrier signal, comprising the steps of:
    (a) setting a calibrate timing interval corresponding to a predetermined number of cycles of said carrier signal;
    (b) counting, from an initial count value, the number of cycles of an oscillator during said calibrate timing interval;
    (c) setting a measure timing interval corresponding to a predetermined number of cycles of said carrier signal;
    (d) counting the number of cycles of said oscillator during said measure timing interval;
    (e) generating a final count corresponding to the difference between the number of cycles of said oscillator that are counted during said calibrate timing interval and the number of cycles that are counted during said measure timing interval; and
    (f) generating an FSK detect signal responsive to said final count.

17. The method of claim 16 in which steps (b) and (d) are spaced apart in time, and are separated by a time interval in which no counting occurs.

18. The method of claim 16 in which step (e) further includes the step of generating a multi-bit digital word having a plurality of logic states as said final count.

19. The method of claim 18 in which step (e) further includes the step of generating a first predetermined group of said logic states that correspond to an occurrence of an FSK detection, and generating a second predetermined group of said logic states that correspond to a non-occurrence of an FSK detection.

20. The method of claim 19 in which step (e) further includes the step of generating a four-bit digital word having sixteen logic states in which four binarily consecutive logic states correspond to said non-occurrence of an FSK detection, and in which twelve binarily consecutive logic states correspond to said occurrence of an FSK detection.

21. The method of claim 16 further comprising the step of repeating steps (a) through (e) in a plurality of cycles, each of said plurality of cycles comprising said predetermined number of cycles of said carrier signal.

22. The method of claim 21 in which steps (b) and (d) within each of said plurality of cycles are spaced apart in time, and are separated by time intervals in which no counting occurs.

23. A method for determining when FSK detection occurs within a time period of an FSK encoded carrier input signal, comprising the steps of:

(a) providing an X-bit counter that is incremented by said carrier signal, said X-bit counter providing X outputs, including an MSB output, said MSB output comprising a square wave cycle having a first half-cycle of a given time duration, and having a second half-cycle of said given time duration;

(b) establishing a calibration-pulse of shorter time duration than said given time duration in response to said first half cycle of said MSB output;

(c) establishing a measure-pulse of said shorter time duration in response to said second cycle of said MSB output;

(d) providing a controllable oscillator;

(e) controlling said oscillator to oscillate during said shorter time intervals of said calibration-pulse and said measure-pulse;

(f) providing a Y-bit up/down counter having an initial count therein, wherein X and Y are integers and where X is greater than Y;

(g) connecting said Y-bit counter to be selectively incremented or decremented by said oscillation of said oscillator;

(g) using said first half cycle of said MSB output to enable said Y-bit counter to increment during said shorter time interval of said calibrate pulse;

(h) using said second half cycle of said MSB output to enable said Y-bit counter to decrement during said shorter time interval of said calibrate pulse, to thereby provide a final count in said Y-bit counter;

(i) determining that FSK detection did not occur when said final count in said Y-bit counter is generally equal to said initial count; and (j) determining that FSK detection did occur when said final count in said Y-bit counter is generally unequal to said initial count.

* * * * *